US010668798B2

(12) United States Patent
Iotti

(10) Patent No.: US 10,668,798 B2
(45) Date of Patent: Jun. 2, 2020

(54) HYBRID DRIVE VEHICLE

(71) Applicant: FERRARI S.p.A., Modena (IT)

(72) Inventor: Corrado Iotti, Modena (IT)

(73) Assignee: FERRARI S.P.A., Modena (IT)

(*) Notice: Subject to any disclaimer, the term of this patent is extended or adjusted under 35 U.S.C. 154(b) by 193 days.

(21) Appl. No.: 15/958,296

(22) Filed: Apr. 20, 2018

(65) Prior Publication Data

US 2018/0304737 A1 Oct. 25, 2018

(30) Foreign Application Priority Data

Apr. 21, 2017 (IT) .................. 102017000044349

(51) Int. Cl.
B60K 6/38 (2007.10)
B60K 6/387 (2007.10)
(Continued)

(52) U.S. Cl.
CPC ............ *B60K 6/387* (2013.01); *B60K 6/26* (2013.01); *B60K 6/50* (2013.01); *B60W 10/02* (2013.01); *B60W 10/06* (2013.01); *B60W 20/10* (2013.01); *B60W 20/17* (2016.01); *B60W 30/20* (2013.01); *F16D 48/08* (2013.01); *B60K 2006/268* (2013.01); *B60W 2030/206* (2013.01); *B60W 2510/0638* (2013.01); *B60W 2510/081* (2013.01); *B60W 2710/021* (2013.01); *B60W 2710/0644* (2013.01); *B60Y 2200/92* (2013.01); *B60Y 2400/421* (2013.01); *B60Y 2400/424* (2013.01); *F16D 11/14* (2013.01); *F16D 13/24* (2013.01); *F16D 21/00* (2013.01); *F16D 23/10* (2013.01); *F16D 2500/1066* (2013.01); *F16D 2500/10412* (2013.01);
(Continued)

(58) Field of Classification Search
CPC ......... B60K 6/387; B60W 10/02; F16D 1/108
See application file for complete search history.

(56) References Cited

U.S. PATENT DOCUMENTS 6,223,842 B1 5/2001 Masaki
7,631,719 B2 * 12/2009 Wenthen ............... B60K 6/365
180/243
(Continued)

FOREIGN PATENT DOCUMENTS

DE 4434111 A1 3/1996
EP 2246230 A1 3/2010
(Continued)

OTHER PUBLICATIONS

Search Report issued in Italian Patent Application No. 201700044349, dated Dec. 14, 2017; 7 pages.

Primary Examiner — Derek D Knight
(74) Attorney, Agent, or Firm — Cantor Colburn LLP

(57) ABSTRACT

A hybrid drive vehicle having: at least one driving wheel; an internal combustion engine provided with a drive shaft; an electric machine provided with its own shaft; a gearbox which transmits motion to the driving wheel; a disengagable coupling which acts as a synchroniser and is interposed, to establish a disconnectable mechanical connection, between the drive shaft and the shaft of the electric machine; and a transmission shaft interposed, to establish a permanent mechanical connection, between the shaft of the electric machine on the opposite side to the coupling and the gearbox.

19 Claims, 3 Drawing Sheets

(51) Int. Cl.
   *B60W 20/10* (2016.01)
   *B60W 10/02* (2006.01)
   *B60W 10/06* (2006.01)
   *B60K 6/50* (2007.10)
   *B60W 30/20* (2006.01)
   *B60W 20/17* (2016.01)
   *B60K 6/26* (2007.10)
   *F16D 48/08* (2006.01)
   *F16D 23/10* (2006.01)
   *F16D 21/00* (2006.01)
   *F16D 11/14* (2006.01)
   *F16D 13/24* (2006.01)
(52) U.S. Cl.
   CPC ............... *F16D 2500/3069* (2013.01); *F16D 2500/30426* (2013.01); *F16D 2500/7041* (2013.01); *F16D 2500/70414* (2013.01); *F16D 2500/70454* (2013.01)

(56) References Cited

U.S. PATENT DOCUMENTS 9,296,380 B2 * 3/2016 Ortmann ............... B60W 10/02
2011/0174586 A1 * 7/2011 Westerberg ............. F16D 23/06
                                                                192/53.32

FOREIGN PATENT DOCUMENTS

EP          2722212 A1    4/2014
WO       1995022014 A1    8/1995

* cited by examiner

HYBRID DRIVE VEHICLE

PRIORITY CLAIM

This application claims priority from Italian Patent Application No. 102017000044349 filed on Apr. 21, 2017, the disclosure of which is incorporated by reference.

TECHNICAL FIELD

The present invention relates to a hybrid drive vehicle.

PRIOR ART

A hybrid (i.e. hybrid drive) vehicle comprises an internal combustion engine, which transmits the drive torque to the driving wheels by means of a transmission provided with a gearbox, and at least one electric machine, which is electrically connected to an electrical energy storage system and mechanically connected to the driving wheels.

One of the most widely used connection arrangements for the electric machine is to insert the machine between the internal combustion engine and the transmission by interposing a disengagable coupling between the internal combustion engine and the electric machine which makes it possible to connect the internal combustion engine to or disconnect it from the electric machine (and thus to/from the transmission). With this connection arrangement, the coupling can be disengaged (separating the internal combustion engine from the electric machine and transmission) to obtain forward electric drive with the functionality of all transmission gears available or to obtain reverse electric drive (i.e. reverse gear) without using specific gears but simply by rotating the electric machine in the opposite direction. With this connection arrangement, the coupling can be engaged (by connecting the internal combustion engine to the electric machine and transmission) to start the internal combustion engine (with the gearbox clutch open if the vehicle is stationary or with the gearbox clutch closed if the vehicle is in motion); to obtain (with the gearbox clutch open) active damping of the torsional oscillations of the internal combustion engine's drive shaft to improve NVH ("Noise, Vibration, Harshness") performance, to generate (with the gear clutch open) electricity for the vehicle's electrical energy storage system or other electrical consumers, to obtain (with the gearbox clutch closed) an increase ("boost") of drive torque by means of the electric machine in addition to the drive torque generated by the internal combustion engine, or to obtain (with the gearbox clutch closed) regenerative braking by means of the electric machine.

In vehicles currently on the market, the coupling consists of a normal clutch, which is sized so as to be able to transmit the maximum drive torque generated by the internal combustion engine. In the case of a large displacement supercharged internal combustion engine, the maximum drive torque, which can be generated by the internal combustion engine can be as much as 1000 Nm and as a result, the clutch, which makes the coupling, is expensive, heavy and bulky. The axial and radial dimensions of the clutch are particularly disadvantageous, which leads to a considerable increase in the size of the powertrain; the considerable radial development of the clutch also leads to high values of mechanical inertia which are not necessary for smooth motion of the internal combustion engine given the presence of the electric machine, and consequently only negative with respect to the ability to accelerate quickly.

The U.S. Pat. No. 6,223,842 B1 and the patent application EP2246230A1 describe a hybrid vehicle equipped with a disengagable coupling, which consists only of a clutch, which is interposed between the electric machine and the internal combustion engine.

DESCRIPTION OF THE INVENTION

The purpose of the present invention is to provide a hybrid drive vehicle, which is free of the drawbacks, described above and, at the same time, is also cost-effective and easy to produce.

According to the present invention, a hybrid drive vehicle is provided, as claimed in the attached Claims.

The Claims describe preferred embodiments of the present invention forming integral parts of the present description.

BRIEF DESCRIPTION OF THE DRAWINGS

The present invention will now be described with reference to the accompanying drawings, which illustrate a non-limiting embodiment example, wherein.

PREFERRED EMBODIMENTS OF THE INVENTION

Figure 1:
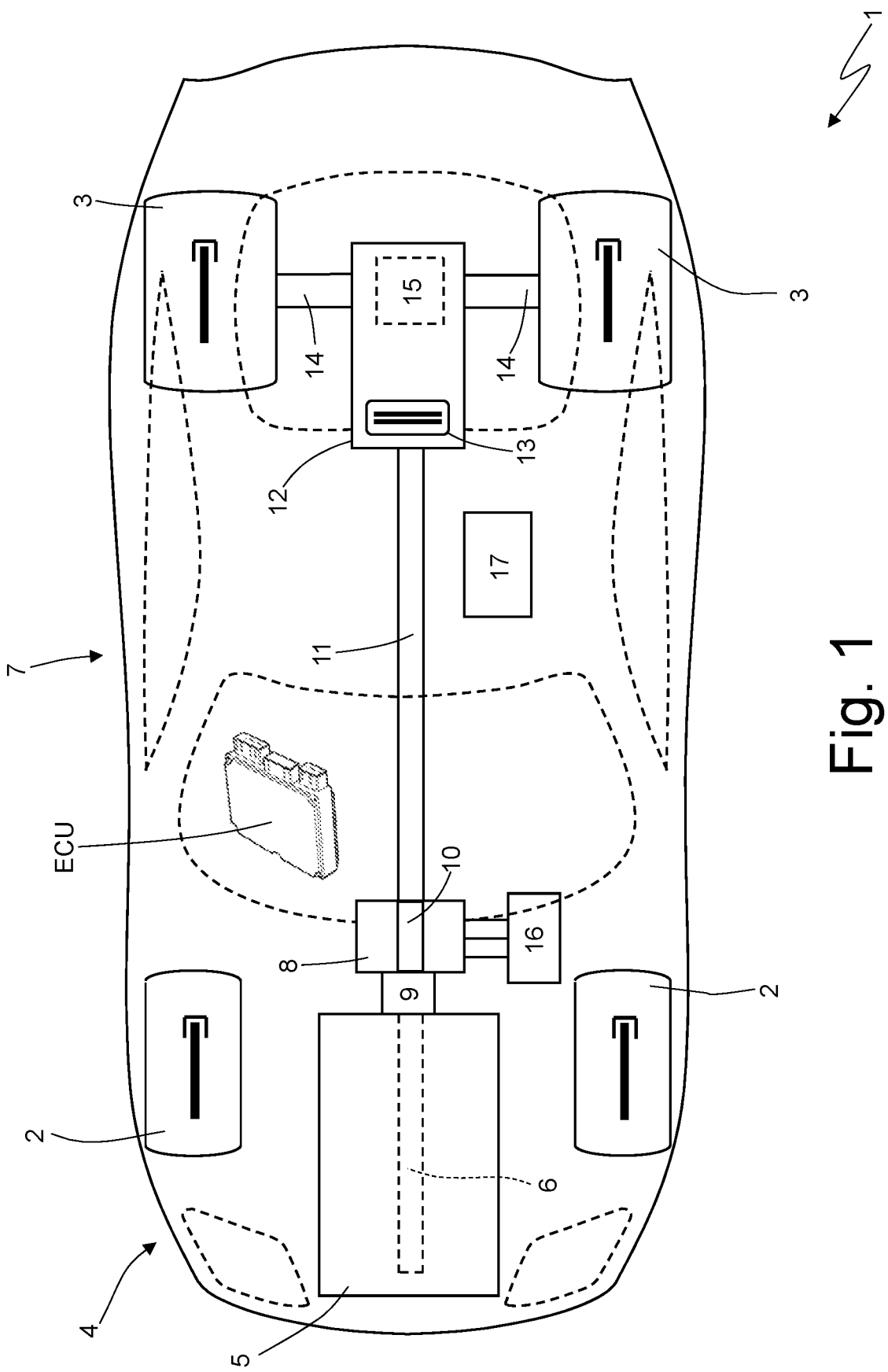
FIG. 1 is a schematic plan view of a hybrid drive road vehicle made in accordance with the present invention.

In FIG. 1, the number 1 indicates in its entirety a hybrid drive road vehicle provided with two front wheels 2 and two rear driving wheels 3, which receive their drive torque from a hybrid powertrain system 4.

The hybrid powertrain system 4 comprises a front-mounted internal combustion engine 5 provided with a drive shaft 6 and a transmission 7 which transmits the drive torque generated by the internal combustion engine 5 to the rear driving wheels 3.

An electric machine 8 is provided which is mechanically connected to the transmission 7 and is reversible (i.e. it can operate both as an electric motor, taking in electric energy and generating a mechanical drive torque, and as an electric generator, taking in mechanical energy and generating electric energy). In particular, the electric machine 8 is positioned at the start of transmission 7 and is mechanically connected to the drive shaft 6 of the internal combustion engine 5 by means of an disengagable coupling 9 (i.e. it can assume an engaged configuration wherein the drive shaft 6 is angularly integral to the shaft 10 of the electric machine 8 and a disengaged configuration wherein the drive shaft 6 is disconnected from the shaft 10 of the electric machine 8). In other words, the coupling 9 is arranged between the drive shaft 6 and the shaft 10 of the electric machine 8 so as to establish a disconnectable mechanical connection.

The transmission 7 comprises a transmission shaft 11 which is angularly integral to the shaft 10 of the electric machine 8 on one side (i.e. it receives the motion of the drive shaft 6 via the shaft 10 of the electric machine 8) and on the other side it is mechanically connected to a gearbox 12; in other words, in order to establish a permanent mechanical connection, the transmission shaft 11 is interposed between the shaft 10 of the electric machine 8 and on the opposite side the coupling 9 and the gearbox 12. The gearbox 12 is arranged in a rear position, is provided with at least one clutch 13 and transmits motion to the rear driving wheels 3 by means of two half axles 14 which receive the motion from a differential 15. The gearbox 12 could be a single clutch gearbox (and thus comprise a single clutch 13) or a double clutch gearbox (and thus comprise two clutches 13).

The electric machine 8 is driven by a direct current to alternating current electrical converter (i.e. an "inverter") 16 which is electrically connected to an electrical energy storage system 17 provided with chemical batteries.

Figure 2:
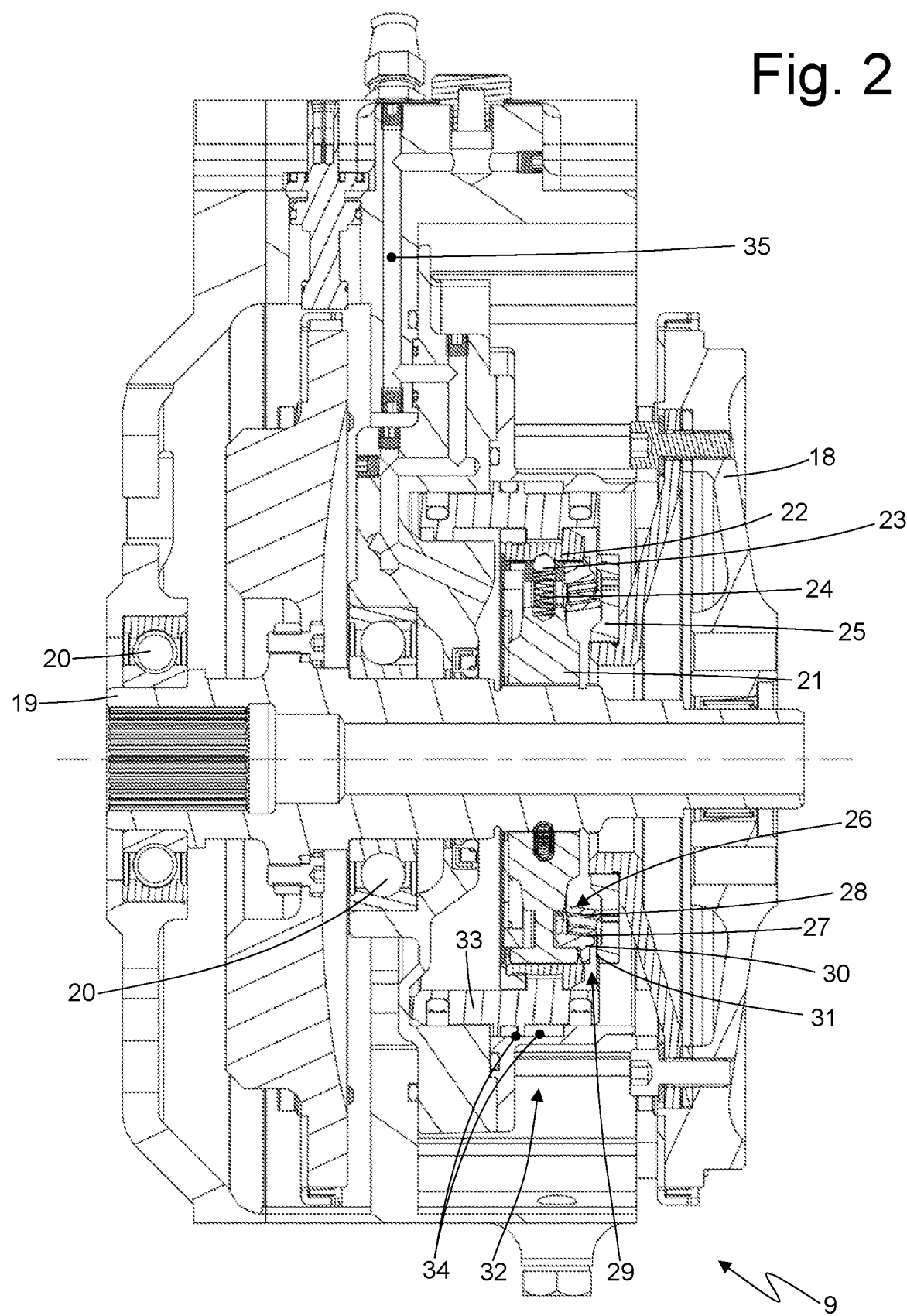
FIG. 2 is a longitudinal cross-section view of part of the vehicle powertrain system of FIG. 1 containing a coupling which is interposed between an internal combustion engine and an electric machine.
Figure 3:
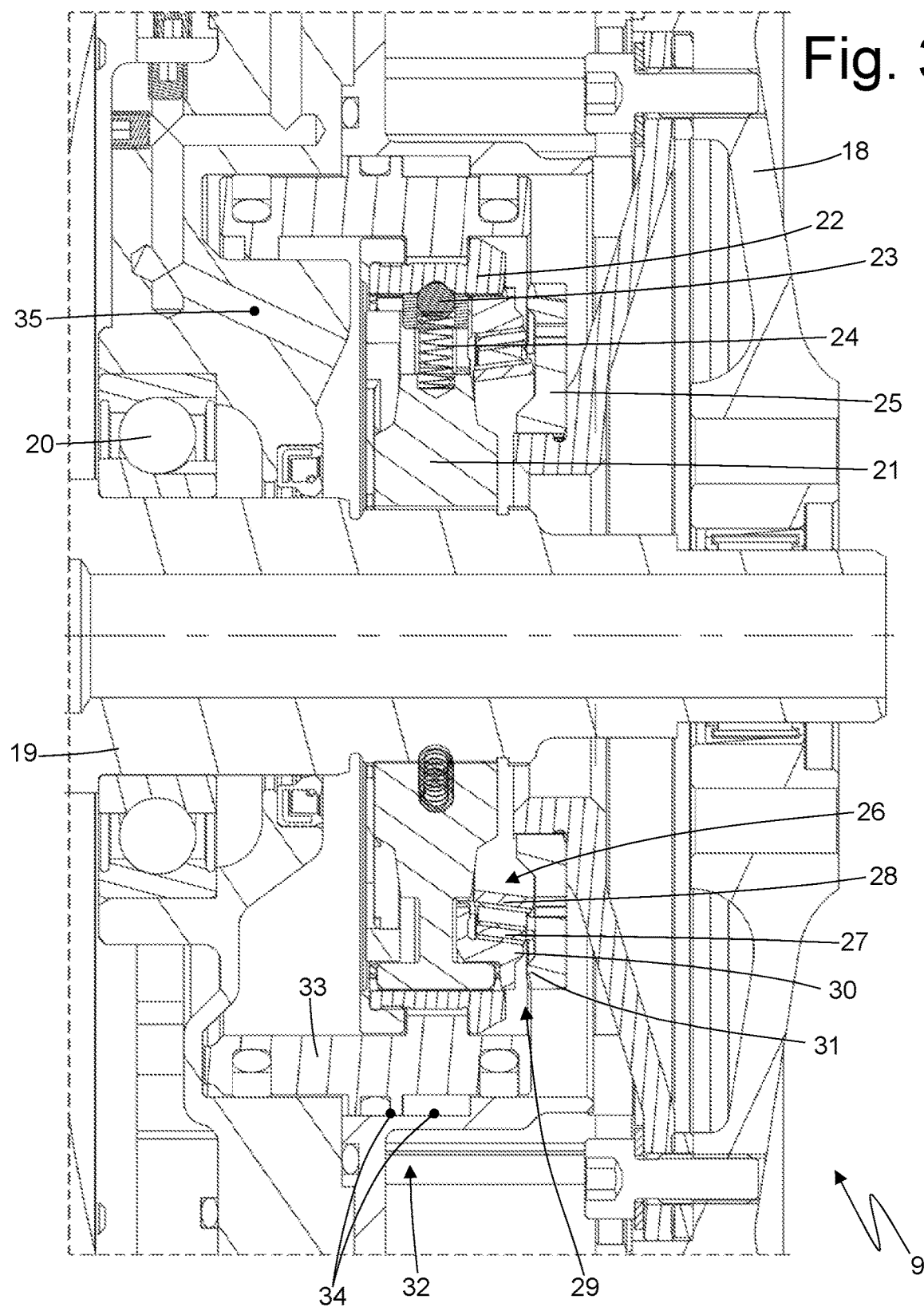
FIG. 3 is a view in enlarged scale of a detail of FIG. 2.

As shown in FIGS. 2 and 3, the drive shaft 6 is provided with a flywheel 18, which is integral to the drive shaft 6.

The coupling 9 comprises an intermediate shaft 19 which is mounted in a frame such that it can rotate by means of a pair of bearings 20 and fitted (i.e. permanently connected) onto the shaft 10 of the electric machine 8. A hub 21 is arranged around the intermediate shaft 19, which is angularly integral to the intermediate shaft 19 and can slide axially with respect to the said intermediate shaft (there is preferably a splined connection interposed between the hub 21 and the intermediate shaft 19). Around the hub 21 there is a sleeve 22, which is angularly integral to the sleeve 22 and can slide axially with respect to the said sleeve 22 (there is preferably a splined coupling interposed between the hub 21 and the sleeve 22). Preferably, the splined mounting of the sleeve has a bigger transverse tolerance (i.e. it has more transverse play) than the splined mounting of the hub 21. Between the hub 21 and the sleeve 22 there are three (spherically shaped) thrust elements 23 which, pushed against an internal surface of the sleeve 22 by their respective springs 24, make it possible to obtain a partially flexible fitting of the sleeve 22 to the hub 21.

The coupling 9 comprises a support ring 25 which is rigidly connected to the flywheel 18, i.e. it is angularly integral to the flywheel 18 and thus to the drive shaft 6.

The coupling 9 comprises a clutch 26 which is functionally arranged between the shaft 10 of the electric machine 8 and the drive shaft 6 and is suitable, in use, to cause the drive shaft 6 to rotate at the same speed as the shaft 10 of the electric machine 8 (i.e., as better described below, to transmit motion from the shaft 10 of the electric machine 8 to the drive shaft 6). The clutch 26 is conically-shaped and comprises a friction surface 27 in the shape of a truncated cone which is supported by the sleeve 22 (i.e. it is rigidly connected to the sleeve 22) and is thus angularly integral to the shaft 10 of the electric machine 8 and a friction surface 28 in the shape of a truncated cone which is supported by the support ring (i.e. it is rigidly connected to the support ring 25) and is thus angularly integral to the drive shaft 6. When the friction surface 27 is pressed against the friction surface 28, rotary motion is transmitted between the shaft 10 of the electric machine 8 and the drive shaft 6 (in particular, as better described below, from the shaft 10 of the electric machine 8 to the drive shaft 6).

The coupling 9 comprises a shape coupling device 29 which is functionally arranged between the shaft 10 of the electric machine 8 and the drive shaft 6 and is suitable, in use, to make the shaft 10 of the electric machine 8 angularly integral to the drive shaft 6 by means of a shape mating (i.e. by means of the interpenetration of parts). In other words, the shape coupling device 29 is functionally arranged parallel to the clutch 26 so that it is suitable to make the shaft 10 of the electric machine 8 angularly integral to the drive shaft 6 instead of to the clutch 26. The shape coupling device 29 comprises a ring of teeth 30 which are supported by the sleeve 22 (i.e. they are rigidly connected to the sleeve 22) and are therefore angularly integral to the shaft 10 of the electric machine 8 and a ring of teeth 31 which are supported by the support ring 25 (i.e. they are rigidly connected to the support ring 25) and are thus angularly integral to the drive shaft 6. When the sleeve 22 (i.e. the shaft 10 of the electric machine 8) is synchronous with the support ring 25 (i.e. the drive shaft 6), the teeth 30 can intermesh with the teeth 31 facing them to obtain a shape mating.

Finally, the coupling 9 comprises an actuator 32 which, in order to establish the connection between the shaft 10 of the electric machine 8 and the drive shaft 6 (i.e. between the sleeve 22 and the support ring 25) when there is no difference in rotation speed (i.e. when both are stationary) actuates the shape coupling device 29 to make the shaft 10 of the electric machine 8 angularly integral to the drive shaft 6. In order to establish the connection between the shaft 10 of the electric machine 8 and the drive shaft 6 (i.e. between the sleeve 22 and the support ring 25) when there is a difference in rotation speed, the actuator device 32 initially actuates the clutch 26 to cause the drive shaft 6 (i.e. the support ring 25) to rotate at the same speed as the shaft 10 of the electric machine 8 (i.e. of the sleeve 22) and once the drive shaft 6 (i.e. the support ring 25) is rotating at the same speed as the shaft 10 of the electric machine 8 (i.e. of the sleeve 22), the shape coupling device 29 operates to make the shaft 10 of the electric machine 8 angularly integral to the drive shaft 6.

The actuator 32 for the coupling 9 is controlled by an electronic control unit (ECU) which supervises the operation of the hybrid powertrain system 4 of the vehicle 1.

In the embodiment shown in the attached Figures, the actuator 32 is a hydraulic actuator comprising an annular thrust element 33 which acts on the sleeve 22 to axially push the said sleeve 22 in either direction; the actuator 32 further comprises two chambers 34 which are suitable to be alternately filled with a pressurised fluid (oil) to alternately move the thrust element 33 in either direction. According to other perfectly equivalent actuators which are not shown, the actuator 32 is differently shaped (for example, the annular thrust element 33 could be replaced by a fork) and/or it might not be of the hydraulic type.

The coupling 9 is provided with a lubrication and cooling circuit 35, via which a stream of pressurised lubricating oil is constantly fed, soaking (lubricating) the hub 21, the sleeve 22, the clutch 26 and the shape coupling device 29; the lubricating oil falls downwards by gravity and is collected in an oil pan below in which the oil is caught in order to return it to circulation.

From the above, it is clear that in the embodiment shown in the attached Figures, the clutch 26 is constructively integrated with the shape coupling device 29. At the same time, the shape coupling device 29 is functionally independent and separate from the clutch 26 and is suitable to make the shaft 10 of the electric machine 8 angularly integral to the drive shaft 6 by means of a shape mating independent of the friction coupling established by the clutch 26. In other words, the clutch 26 and the shape coupling device 29 are constructively integrated so as to share a large part of the mechanical components (for obvious requirements of reducing cost, weight and size) but, at the same time, the clutch 26 and the shape coupling device 29 are functionally independent and separate, i.e. it is possible to cause the shaft 10 of the electric machine 8 to be angularly integral to the drive shaft 6 by means of the single clutch 26 or, alternatively, it is possible to cause the shaft 10 of the electric machine 8 to be angularly integral to the drive shaft 6 solely by means of the shape coupling device 29 (in this regard, it is important to note that the clutch 26 and the shape coupling device 29 are alternatives to each other, i.e. connection of the shaft 10 of the electric machine 8 to the drive shaft 6 can be made either by means of the clutch 26 alone or by means of the shape coupling device 29 alone, but not both at the same time).

It is important to note that the coupling 9 described above corresponds with a synchroniser normally used in an automotive gearbox; i.e. the coupling 9 is a commercial gearbox component (i.e. it is easily available on the market) and is used in a completely new position, i.e. no longer within a gearbox but between the shaft 10 of the electric machine 8 and the drive shaft 6.

In the embodiment shown in the attached Figures, the drive shaft 6 is provided with flywheel 18 and therefore the coupling 9 is connected to the drive shaft 6 by means of the interposed flywheel 18; i.e. the coupling 9 is rigidly fixed to the flywheel 18, which in turn is rigidly fixed to the drive shaft 6. According to a different embodiment which is not shown, the drive shaft 6 has no flywheel at all and the disengagable coupling 9 is directly connected to the drive shaft 6; in this embodiment the flywheel function is carried out by the rotor of the electric machine 8 (i.e. by exploiting the mechanical inertia of the rotor of the electric machine 8).

The clutch 26 of the coupling 9 is sized so as to transmit a maximum torque, which is less than the maximum torque that can be generated by the internal combustion engine 5 and is substantially equal to the starting torque needed to start the internal combustion engine 5 starting from the standstill condition. In other words, the clutch 26 of the coupling 9 is never used to transmit the torque generated by the internal combustion engine 5, which can reach a maximum value of up to 1000 Nm in the case of a V8 turbocharged eight-cylinder engine, to the rear driving wheels 3 but is solely used to transmit the torque generated by the electric machine 8 to the internal combustion engine 5 which is intended solely for starting the internal combustion engine 5 (the starting torque of the internal combustion engine 5 is of the order of 100 Nm in the case of a turbocharged V8 engine).

The operation of the coupling 9 is described below.

As described above, the clutch 26 of the coupling 9 is solely used to transmit a starting torque generated by the electric machine 8 to the drive shaft 6 when it is necessary to start the internal combustion engine 5 from standstill. For all other operating modes, the coupling 9 is fully disengaged in order to isolate the drive shaft 6 from the electric machine 8 and the transmission 7 or the coupling 9 is engaged via the shape coupling device 29 in order to transfer the drive torque to or from the internal combustion engine 5.

According to a possible embodiment, in order to start the internal combustion engine 5 starting from standstill and with the vehicle 1 in motion, the coupling 9 is initially partially engaged to actuate the single clutch 26 of the coupling 9; in this way the starting torque is transmitted to the drive shaft 6 via the clutch 26 of the coupling 9 which makes it possible to start the internal combustion engine 5 (i.e. the drive shaft 6 starts to rotate and when it has reached the minimum starting speed, the internal combustion engine 5 starts up). Once the internal combustion engine 5 has been started, the coupling 9 is fully disengaged to release the drive shaft 6 from the electric machine 8 and thus from the transmission 7 and, at the same time, the internal combustion engine 5 is controlled to cause the drive shaft 6 to rotate at substantially the same speed as the shaft 10 of the electric machine 8. When the drive shaft 6 is rotating at substantially the same speed as the shaft 10 of the electric machine 8, the coupling 9 is completely engaged until the shape mating is attained. According to a possible embodiment, the internal combustion engine 5 is controlled so as to reach a rotation speed that is slightly faster (for example 50-200 rpm faster) than the rotation speed of the electric machine 8, before completely engaging the coupling 9 until the shape mating is obtained. According to a possible embodiment, the internal combustion engine 5 is turned off when the coupling 9 is engaged until the shape mating is achieved and is turned on again immediately after the shape mating is achieved.

This embodiment is more complex (i.e. it requires more operations) and has the benefit of stressing the clutch 26 of the coupling 9 less, since the clutch 26 of the coupling 9 only has to accelerate the drive shaft 6 of the internal combustion engine 5 from standstill up to the starting rotation speed (300-400 rpm); in fact, the synchronisation of the internal combustion engine 5 with the electric machine 8 (i.e. with the transmission 7) takes place by exploiting the drive torque generated by the internal combustion engine 5 and not the drive torque generated by the electric machine 8. Thus, this embodiment is used when the speed of the electric machine 8 (i.e. of the transmission 7) is significantly higher than the starting speed of the internal combustion engine 5.

According to a further embodiment, in order to start the internal combustion engine 5 from standstill and with the vehicle 1 in motion, the coupling 9 is initially and partially engaged in order to activate the single clutch 26 of the coupling 9 until the drive shaft 6 is synchronous with the shaft 10 of the electric machine 8; when the drive shaft 6 is synchronous with the shaft 10 of the electric machine 8, the coupling 9 is completely engaged until shape mating is achieved. Finally, the internal combustion engine 5 is started once the shape mating of the coupling 9 has been achieved.

This embodiment is simpler (i.e. it requires fewer operations) and has the disadvantage of placing greater stress on the clutch 26 of the coupling 9, since the clutch 26 of the coupling 9 must accelerate the drive shaft 6 of the internal combustion engine 5 from standstill up to the speed of rotation of the electric machine 8 (i.e. of the transmission 7), which can also be much faster than the starting rotation speed (300-400 rpm); in fact, synchronisation of the internal combustion engine 5 with the electric machine 8 (i.e. with the transmission 7) takes place solely using the drive torque generated by the electric machine 8. Thus, this embodiment is used when the speed of the electric machine 8 (i.e. of the transmission 7) is close to (or in any case not far different from) the starting speed of the internal combustion engine 5.

According to a possible embodiment, in order to start the internal combustion engine 5 starting from standstill and with the vehicle 1 stationary, the coupling 9 is completely engaged until shape mating is obtained, keeping the internal combustion engine 5 and the electric machine 8 at standstill; once the shape mating of the coupling 9 has been obtained, the electric machine 8 is brought into rotation so as to drive rotation of the internal combustion engine 5 until the internal combustion engine 5 starts up. This embodiment is simpler (i.e. it requires fewer operations) and does not involve any stress on the clutch of the coupling 9, but it has the disadvantage of requiring the electric machine 8 to generate a very high starting torque (since, starting from a standstill, the electric machine 8 must also drive the internal combustion engine 5 into rotation); thus, on the one hand the electric machine 8 must be sized to generate a very high starting torque, on the other hand the inverter 16 which drives the electric machine 8 must be sized to supply the starting current required by the electric machine 8.

According to an alternative embodiment, to start the internal combustion engine 5 from standstill and with the vehicle 1 stationary, the electric machine 8 is initially brought into rotation on its own with the coupling 9 completely disengaged until the starting rotation speed (for example about 400 rpm) is attained which allows sufficient kinetic energy to be accumulated in the electric machine 8, and then the coupling 9 is engaged only when the electric machine 8 is rotating (thus initially using the clutch 26 of the coupling 9 to accelerate the drive shaft 6 of the internal combustion engine 5 from standstill to the rotation speed of the electric machine 8 and then engaging the shape coupling device 29 so as to obtain the shape mating when the drive shaft 6 is synchronous with the shaft 10 of the electric machine 8). In other words, a "launched" starting of the internal combustion engine 5 is achieved, in which the electric machine 8 is pre-emptively brought into rotation in order to accumulate kinetic energy before initiating rotation of the drive shaft 6 of the internal combustion engine 5. This embodiment is more complex (i.e. it requires more operations) and involves the use of clutch of the coupling 9, but it makes it possible to considerably reduce the starting torque required of the electric machine 8 (and thus also the starting current demanded by the electric machine 8); in this way, the electric machine 8 and the corresponding inverter 16 can be undersized with respect to the solution which involves establishing the mechanical connection between the shaft 10 of the electric machine 8 and the drive shaft 6 of the internal combustion engine 5 before setting into rotation the shaft 10 of the electric machine 8. This solution is particularly beneficial when the electric machine 8 has a low nominal voltage (typically 48 Volts), as in this case the starting currents would be very high.

To summarise, it has been observed that the torque values needed to be transferred between the internal combustion engine 5 and the electric machine 8 are not symmetrical: from the electric machine 8 to the internal combustion engine 5, it is necessary to transfer at most the drive torque needed to start the internal combustion engine 5, while from the internal combustion engine 5 to the electric machine 8 (i.e. to the transmission 7) it is necessary to be able to deliver the entire drive torque of the internal combustion engine 5, which can be up to ten times the starting torque.

In use, the transition from electric operation to internal combustion engine operation requires starting the internal combustion engine 5, which is achieved by transmitting the starting torque from the electric machine 8 to the internal combustion engine 5 via the clutch 26 of the coupling 9; it should be noted that in this operating mode it is necessary to be able to make torque flow through the coupling 9 starting from a situation of non-synchronisation between the electric machine 8 (in motion) and the internal combustion engine 5 (stopped) and for this reason the transmission of torque to the internal combustion engine 5 takes place by friction through the clutch 26 of the coupling 9 and not by shape mating via the shape coupling device 29.

In use, transfer of the drive torque supplied by the internal combustion engine 5 to the electric machine 8 and thus to the transmission 7 takes place solely by shape mating via the shape coupling device 29 (in the situation in which the internal combustion engine 5 is engaged, and thus synchronised, with the electric machine 8 and with the rest of transmission 7).

In the embodiment in the attached Figures, a vehicle with four wheels 2, 3 with two driving wheels 3 is described; alternatively, the vehicle could have all four wheels driven, more than four wheels, or only two wheels (with only one wheel driven) or three wheels (generally with two wheels driven).

The embodiments described herein can be combined without thereby departing from the protective scope of the present invention.

The hybrid drive vehicle 1 described above has numerous benefits.

Firstly, the hybrid drive vehicle 1 described above makes it possible to reduce the size, weight and cost of the coupling 9 since the clutch 26 of the coupling is sized to transmit only the starting torque, which is a small fraction (8-15%) of the maximum torque that can be generated by the internal combustion engine 5. The weight of the coupling 9 can thus be reduced by more than 70%, the axial dimensions of the coupling 9 can be reduced by more than 80%, and the radial dimensions of the coupling 9 can be reduced by more than 60% (with a consequent reduction in mechanical inertia).

The hybrid drive vehicle 1 described above further makes it possible to minimize the production cost of the coupling 9 because the coupling 9 is easily available on the market, being commonly used in gearboxes.

LIST OF REFERENCE NUMBERS IN THE FIGURES 1 vehicle
2 front wheels
3 rear driving wheels
4 powertrain system
5 engine
6 drive shaft
7 transmission
8 electric machine
9 coupling
10 electric machine shaft
11 transmission shaft
12 gearbox
13 clutch
14 half axle
15 differential
16 inverter
17 electrical energy storage system
18 flywheel
19 intermediate shaft
20 bearings
21 hub
22 sleeve
23 thrust elements
24 springs
25 support ring
26 clutch
27 friction surface
28 friction surface
29 shape coupling device
30 teeth
31 teeth
32 hydraulic actuator
33 thrust elements
34 chambers
35 lubrication and cooling circuit

The invention claimed is:
1. A hybrid drive vehicle (1) comprising:
at least one driving wheel (3);
an internal combustion engine (5) provided with a drive shaft (6);
at least one electric machine (8) provided with a shaft (10);
a gearbox (12), which transmits the motion to the driving wheel (3);

a disengagable coupling (9), which is interposed between the drive shaft (6) and the shaft (10) of the electric machine (8) so as to establish a mechanical connection that can be interrupted; and a transmission shaft (11), which is interposed between the shaft (10) of the electric machine (8) on the opposite side relative to the coupling (9) and the gearbox (12) so as to establish a permanent mechanical connection;

wherein the coupling (9) comprises: a clutch (26) which is suitable to cause the drive shaft (6) to rotate at the same speed as the shaft (10) of the electric machine (8) establishing a clutch coupling; and an actuator (32) which is suitable to actuate the clutch (26) to cause the drive shaft (6) to rotate at the same speed as the shaft (10) of the electric machine (8);

wherein the coupling (9) comprises a shape coupling device (29) which is functionally independent and separate from the clutch (26) and is suitable to make the shaft (10) of the electric machine (8) angularly integral to the drive shaft (6) by means of a shape mating independent of the friction coupling established by the clutch (26);

wherein the clutch (26) of the coupling (9) is never used to transmit the torque generated by the internal combustion engine (5) to the driving wheel (3); and wherein the clutch (26) of the coupling (9) is only used to transmit a torque generated by the electric machine (8) to the internal combustion engine (5) and intended solely for starting the internal combustion engine (5).

2. The hybrid drive vehicle (1) according to claim 1, wherein:

the actuator (32), in order to establish the connection between the shaft (10) of the electric machine (8) and the drive shaft (6) when there is no difference in rotation speed, i.e. when both are stationary, actuates the shape coupling device (29) to make the shaft (10) of the electric machine (8) angularly integral to the drive shaft (6); and the actuator (32), in order to establish the connection between the shaft (10) of the electric machine (8) and the drive shaft (6) when the drive shaft (6) is stationary, initially actuates the clutch (26) to cause the drive shaft (6) to rotate at the same speed as the shaft (10) of the electric machine (8) and, once the drive shaft (6) is rotating at the same speed as the shaft (10) of the electric machine (8), actuates the shape coupling device (29) to make the shaft (10) of the electric machine (8) angularly integral to the drive shaft (6).

3. The hybrid drive vehicle (1) according to claim 1, wherein the clutch (26) is constructively integrated with the shape coupling device (29).

4. The hybrid drive vehicle (1) according to claim 3, wherein the shape coupling device (29) comprises a sleeve (22), which is mounted so as to axially slide due to the thrust of the actuator (32), supports a first conical friction surface (27) that is part of the clutch (26), and supports first teeth (30) that enable the shape mating.

5. The hybrid drive vehicle (1) according to claim 4, wherein the shape coupling device (29) comprises a support ring (25), which has a second conical friction surface (28), which is part of the clutch (26) and is suitable to be coupled to the first conical friction surface (27), and second teeth (31), which enable the shape mating together with the first teeth (30).

6. The hybrid drive vehicle (1) according to claim 5, wherein the sleeve (22) is angularly integral to the shaft (10) of the electric machine (8) and the support ring (25) is angularly integral to the drive shaft (6).

7. The hybrid drive vehicle (1) according to claim 1, wherein the disengagable coupling (9) is connected to the drive shaft (6) through the interposition of a flywheel (18).

8. The hybrid drive vehicle (1) according to claim 1, wherein the disengagable coupling (9) is directly connected to the drive shaft (6), which is completely without a flywheel.

9. The hybrid drive vehicle (1) according to claim 1, wherein the clutch (26) of the coupling (9) is sized so as to transmit a maximum torque, which is less than the maximum torque that can be generated by the internal combustion engine (5) and is equal to the starting torque needed to start the internal combustion engine (5) starting from the standstill condition.

10. The hybrid drive vehicle (1) according to claim 1, wherein the shape coupling device (29) is functionally arranged parallel to the clutch (26) so that it is able to make the shaft (10) of the electric machine (8) angularly integral to the drive shaft (6) instead of to the clutch (26).

11. The hybrid drive vehicle (1) according to claim 1, wherein the gearbox (12) is provided with at least one additional clutch (13) which is completely separate and independent from the clutch (26) of the coupling (9).

12. The control method according to claim 11, wherein the internal combustion engine (5) is turned off when the coupling (9) is engaged until the shape mating is obtained and is turned on again immediately after shape mating is achieved.

13. A control method for the hybrid drive vehicle (1) according to claim 1 and comprising, in order to start the internal combustion engine (5) starting from the standstill condition and with the vehicle (1) in motion, the steps of:

partially engaging the coupling (9) in order to operate the single clutch (26) of the coupling (9);

starting the internal combustion engine (5) once the drive shaft (6) has reached the minimum starting speed;

completely disengaging the coupling (9) once the internal combustion engine (5) has started;

controlling the internal combustion engine (5) so as to cause the drive shaft (6) to rotate at substantially the same speed as the shaft (10) of the electric machine (8); and completely engaging the coupling (9) until the shape mating is obtained, when the drive shaft (6) rotates at substantially the same speed as the shaft (10) of the electric machine (8).

14. The control method according to claim 13, wherein the internal combustion engine (5) is controlled so as to reach a rotation speed that is slightly faster than the rotation speed of the electric machine (8), before completely engaging the coupling (9) until the shape mating is obtained.

15. A control method for the hybrid drive vehicle (1) according to claim 1 and comprising, in order to start the internal combustion engine (5) starting from the standstill condition and with the vehicle (1) stationary, the steps of:

partially engaging the coupling (9) so as to operate the single clutch (26) of the coupling (9) until the drive shaft (6) is synchronous with the shaft (10) of the electric machine (8);

completely engaging the coupling (9) until the shape mating is obtained, when the drive shaft (6) is synchronous with the shaft (10) of the electric machine (8); and starting the internal combustion engine (5) once the shape mating of the coupling (9) has been obtained.

16. A control method for the hybrid drive vehicle (1) according to claim 1 and comprising, in order to start the internal combustion engine (5) starting from the standstill condition and with the vehicle (1) stationary, the steps of:
completely engaging the coupling (9) until the shape mating is obtained, keeping the internal combustion engine (5) and the electric machine (8) stopped; and
causing the rotation, once the shape mating of the coupling (9) is obtained, of the electric machine (8) in order to initiate rotation of the internal combustion engine (5) until the said internal combustion engine (5) is started.

17. A control method for the hybrid drive vehicle (1) according to claim 1 and comprising, in order to start the internal combustion engine (5) starting from the standstill condition and with the vehicle (1) stationary, the steps of:
completely disengaging the coupling (9);
causing the rotation of the sole electric machine (8) until a starting rotation speed is reached;
partially engaging the coupling (9) in order to operate the single clutch (26) of the coupling (9); and
starting the internal combustion engine (5) once the drive shaft (6) has reached the minimum starting speed.

18. A hybrid drive vehicle (1) comprising:
at least one driving wheel (3);
an internal combustion engine (5) provided with a drive shaft (6);
at least one electric machine (8) provided with a shaft (10);
a gearbox (12), which transmits the motion to the driving wheel (3);
a disengagable coupling (9), which is interposed between the drive shaft (6) and the shaft (10) of the electric machine (8) so as to establish a mechanical connection that can be interrupted; and
a transmission shaft (11), which is interposed between the shaft (10) of the electric machine (8) on the opposite side relative to the coupling (9) and the gearbox (12) so as to establish a permanent mechanical connection;
wherein the coupling (9) comprises: a clutch (26) which is suitable to cause the drive shaft (6) to rotate at the same speed as the shaft (10) of the electric machine (8) establishing a clutch coupling; and an actuator (32) which is suitable to actuate the clutch (26) to cause the drive shaft (6) to rotate at the same speed as the shaft (10) of the electric machine (8);
wherein the coupling (9) comprises a shape coupling device (29) which is functionally independent and separate from the clutch (26) and is suitable to make the shaft (10) of the electric machine (8) angularly integral to the drive shaft (6) by means of a shape mating independent of the friction coupling established by the clutch (26); and
wherein the disengagable coupling (9) is connected to the drive shaft (6) through the interposition of a flywheel (18).

19. A hybrid drive vehicle (1) comprising:
at least one driving wheel (3);
an internal combustion engine (5) provided with a drive shaft (6);
at least one electric machine (8) provided with a shaft (10);
a gearbox (12), which transmits the motion to the driving wheel (3);
a disengagable coupling (9), which is interposed between the drive shaft (6) and the shaft (10) of the electric machine (8) so as to establish a mechanical connection that can be interrupted; and
a transmission shaft (11), which is interposed between the shaft (10) of the electric machine (8) on the opposite side relative to the coupling (9) and the gearbox (12) so as to establish a permanent mechanical connection;
wherein the coupling (9) comprises: a clutch (26) which is suitable to cause the drive shaft (6) to rotate at the same speed as the shaft (10) of the electric machine (8) establishing a clutch coupling; and an actuator (32) which is suitable to actuate the clutch (26) to cause the drive shaft (6) to rotate at the same speed as the shaft (10) of the electric machine (8);
wherein the coupling (9) comprises a shape coupling device (29) which is functionally independent and separate from the clutch (26) and is suitable to make the shaft (10) of the electric machine (8) angularly integral to the drive shaft (6) by means of a shape mating independent of the friction coupling established by the clutch (26);
wherein the gearbox (12) is provided with at least one additional clutch (13) which is completely separate and independent from the clutch (26) of the coupling (9); and
wherein the internal combustion engine (5) is turned off when the coupling (9) is engaged until the shape mating is obtained and is turned on again immediately after shape mating is achieved.

* * * * *